Dec. 19, 1972  N. E. KLEIN  3,706,623
AUTOMATIC BELT DOFFER
Filed Sept. 4, 1969  3 Sheets-Sheet 1
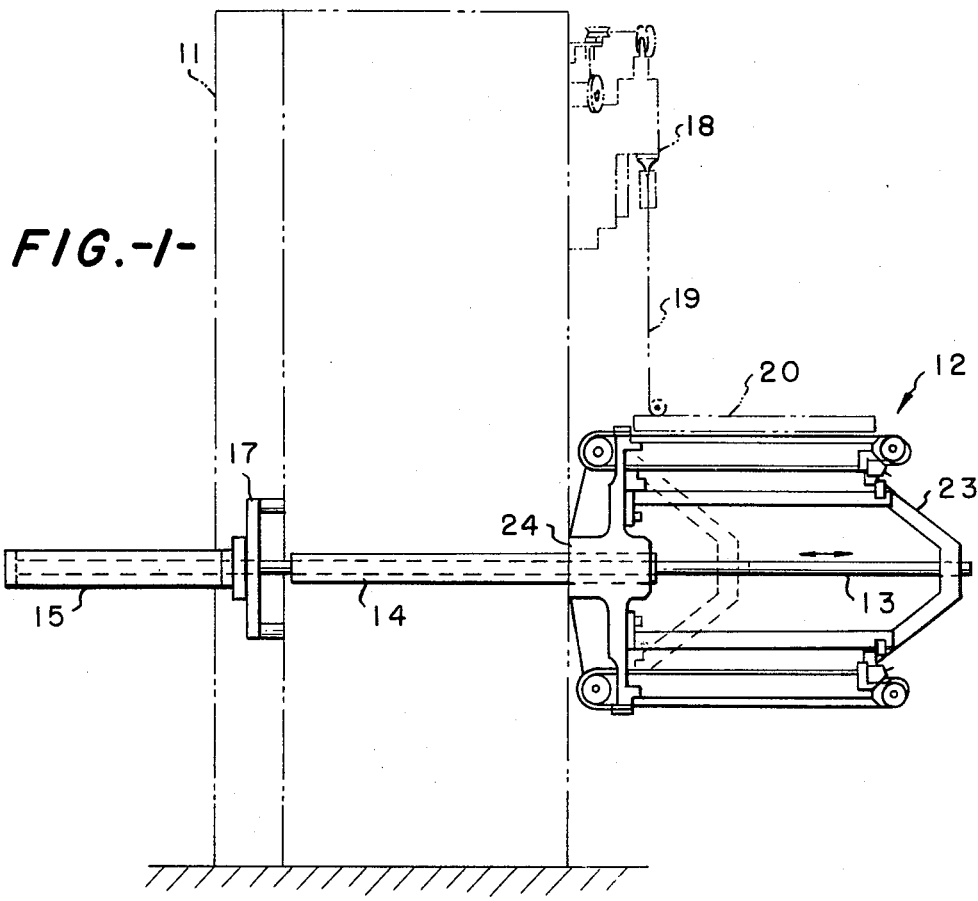
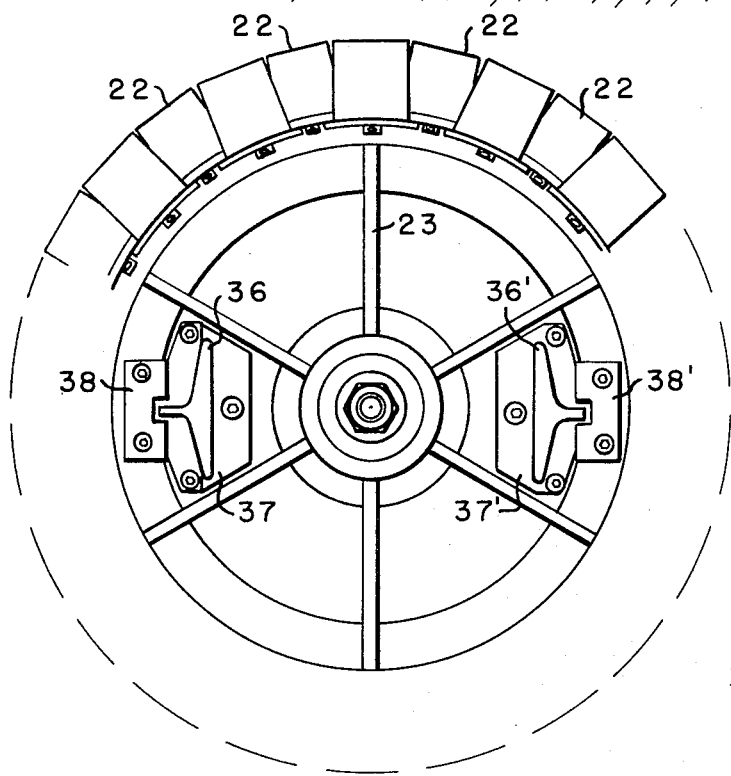
INVENTOR.
NORMAN E. KLEIN
BY
ATTORNEY

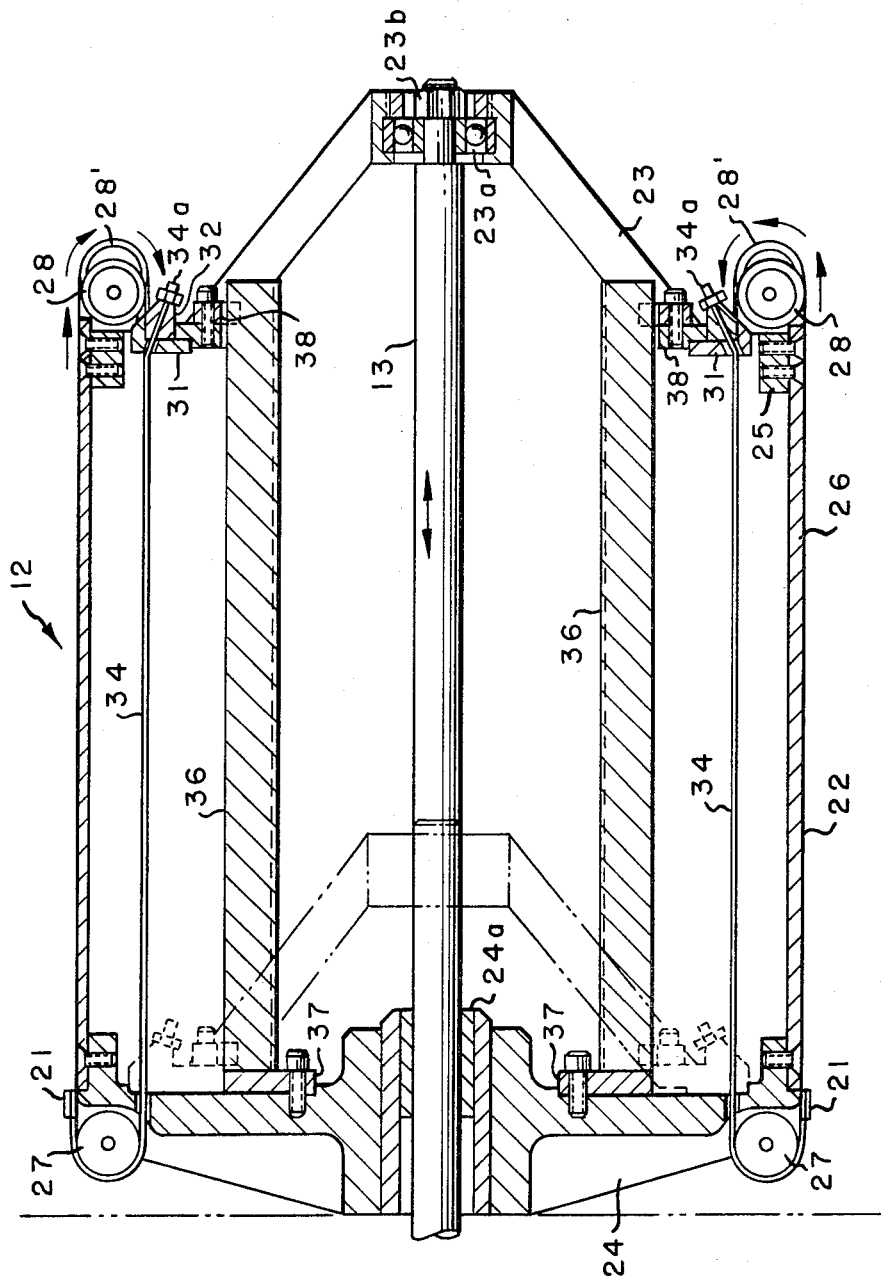

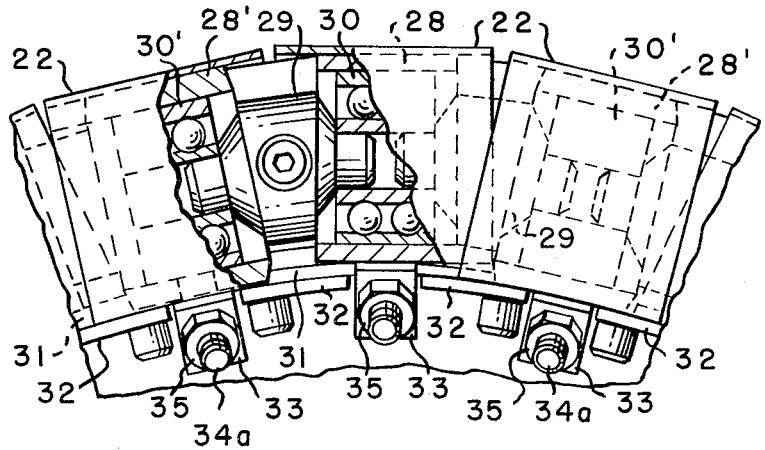
FIG.-4-
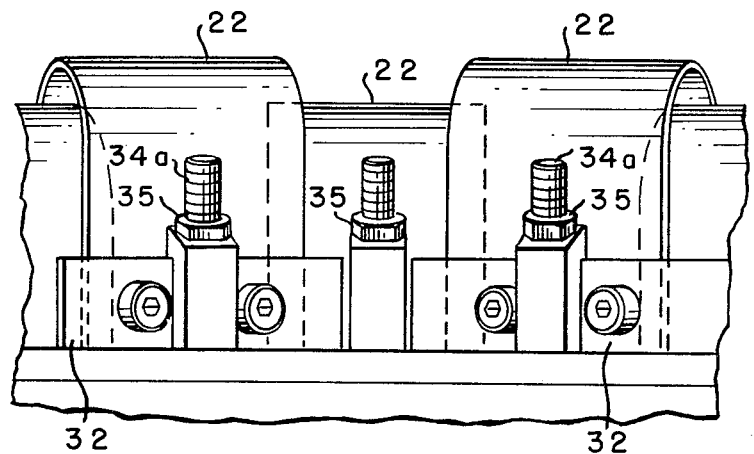
FIG.-5-
INVENTOR.
NORMAN E. KLEIN
BY
ATTORNEY

United States Patent Office 3,706,623
Patented Dec. 19, 1972

3,706,623
AUTOMATIC BELT DOFFER
Norman E. Klein, Inman, S.C., assignor to Deering Milliken Research Corporation, Spartanburg, S.C.
Filed Sept. 4, 1969, Ser. No. 855,220
Int. Cl. B29h 17/14, 17/16
U.S. Cl. 156—394                    5 Claims

ABSTRACT OF THE DISCLOSURE

A method for removing an endless belt from a surface which comprises moving a forward portion of the surface which is in contact with the endless belt in a direction toward the axis of the surface, peeling the forward portion of the surface from the belt and advancing the endless belt off the end of the surface. Also, apparatus for removing an endless belt from a drum.

---

In the production of pneumatic tires of both radial and bias ply construction, it is known to apply an annular or reinforcing strip about the periphery of the tire between the tread and main body portion or carcass for better road stability and longer tread life for the tire. Such reinforcing belts are formed of relatively inextensible threads or cords such as fiber glass, which have been coated with or embedded in a suitable insulating material, e.g., rubber, a plastic or other resinous materials. These coatings serve to prevent direct cord to cord contact while anchoring the cords in a desired belt pattern. The belts may be formed from woven fabric which preferably is bias cut and combined with rubber, e.g., in a calendering operation, and then spliced or lapped to provide an endless belt. Also, cords can be wound on a cylindrical surface in a pattern so that portions thereof extend in a zigzag pattern and at an angle with respect to the longitudinal axis of the belt. Examples of such endless belts include the types described in U.S. Pats. Nos. 2,982,327 and 3,422,874.

When such belts are formed by winding, it is customary to coat or wrap the cord with a covering such as unvulcanized rubber, which is quite tacky or sticky and provides a pressure sensitive adhesive affinity between the cord and support surface to permit it to be positioned on the drum surface in the desired pattern. Because of this adhesive affinity, it is difficult to remove an endless belt from the cylindrical surface or drum on which the belt is built. If the tackiness of the rubber coating is reduced by adjusting the formulation of the rubber or by other means, there may be insufficient adhesion between the coated cord and the building drum, and the cord may slip resulting in the formation of a distorted non-uniform belt. On the other hand, if sufficient adhesion exists between the coated cord and the drum surface, it is difficult to remove the endless belt from the surface without stretching or distorting portions of the belt and thereby creating nonuniformity therein.

Various methods and means have been proposed to facilitate doffing of an endless belt from a belt building drum. One of these employs a wand or stick which is inserted between the belt and the drum at an angle to force the belt off the drum as the drum is rotated. Also, it has been proposed to employ a hollow wand with an opening at its tip and to force air through the opening to facilitate the relative movement of the drum and the belt. Alternately, a wand may be used which is fitted with a series of freely rotatable sleeves to aid in the removal of the belt. Although these procedures provide some assistance in the removal of a belt from a drum, the operation is time-consuming and requires a great deal of skilled manual labor. In addition, a collapsible drum has been used to assist in the removal of the belt, but the belt tends to adhere to portions of the drum surface even after it is collapsed.

The present invention provides a novel method and apparatus for simply and conveniently removing an endless belt from a surface to which it has an adhesive affinity. Moreover, the present invention provides a method and apparatus which permits the doffing of an endless belt from a building drum automatically and at a rapid rate so as to facilitate integration of the operation into an automated tire building process.

Other advantages of the present invention will be illustrated further by reference to the accompanying drawings in which:

FIG. 1 is a schematic illustration of one form of apparatus providing automatic removal of a belt in accordance with the invention;

FIG. 2 is an enlarged side elevation of the drum portion of the apparatus shown in FIG. 1;

FIG. 3 is a right end view of the apparatus shown in FIG. 2;

FIG. 4 is a further enlarged view of a portion of the drum shown in FIG. 3; and

FIG. 5 is a view from below of the portion of the drum shown in FIG. 4.

As shown in FIG. 1, the apparatus of the invention includes a supporting frame 11 in which the drive assembly (not shown) is located. A building drum 12 is affixed to one end of a hollow shaft 14 carried by the supporting frame 11. A push rod 13 disposed in shaft 14 is attached to a pneumatic cylinder 15 or similar actuating means secured to support frame 11 through bracket 17. Cord coating apparatus 18 is mounted on frame 11 above building drum 12. Coated cord 19 is transferred to the drum 12 by a suitable guide mechanism 20 located adjacent to the periphery of the building drum.

The building drum 12 which is shown in greater detail in FIGS. 2 and 3 includes a supporting assembly formed by a hub flange member 24 with a sleeve bearing 24a and a cylindrical sleeve support 26 secured to the hub flange 24. Idler pulleys 27 are positioned about the periphery of flange 24 adjacent the support 26. At the opposite end of support 26 is disposed a thrust ring 23 which is mounted on a stepped down portion of push rod 13 through bearing 23a and nut 23b. Sleeve pulleys 28 and 28' are affixed to the outboard end of support 26 through mounting ring 25. Sleeve pulleys 28 and 28' are maintained in proper position by gudgeons 29 (FIG. 4) attached to ring 25 and disposed between adjacent sleeve pulleys and engaging sleeve bearings 30 and 30' disposed within each of the respective pulleys. Pulleys 28 and 28' are offset and of slightly different diameters with pulleys 28' being slightly larger. As shown in FIGS. 2 and 5, this provides over and under clearance for a plurality of bands 22 wrapped about the sleeve pulleys. The bands 22 are secured to the thrust ring 23 through a band anchor ring 31 and band clamps 32 having extensions 33. The opposite ends of the bands 22 adjacent to the flange 24 are affixed via cleat 21 to flexible cables 34 which are wrapped around idler pulleys 27 and extend to cable bolts 34a which pass through band clamp extensions 33. Tension in bands 22 and cables 34 is controlled by the adjustment of nuts 35 on cable bolts 34a.

Alignment of thrust ring 23 with respect to flange 24 is maintained by upstanding T sections 36 and 36' affixed to flange 24 through brackets 37 and 37'. T sections 36 and 36' extend from flange 24 toward thrust ring 23. Slotted guide plates 38 and 38' affixed to thrust ring 23 are located so the respective slots of the guide plates are aligned with the upstanding legs of the T sections.

In the operation of the apparatus of the invention, a coated cord 19 is wound on the drum 12 employing the guide mechanism 20 to position the cord in a desired pattern on the drum surface. Upon completion of the belt, pneumatic cylinder 15 is actuated drawing push rod 13 toward the cylinder causing thrust ring 23 to be drawn toward hub flange 24. At the same time, the forward portion of each band 22 moves axially first and then toward the axis of the drum around the respective sleeve pulleys 28 and 28' and inwardly in a "hairpin" turn. Likewise, the cables 34 attached to the bands 22 move around idler pulleys 27 and over support 26. This movement of the bands 22 around the sleeve pulleys 28 and 28' causes a belt disposed on the bands 22 to advance off the end of the drum. The movement of the thrust ring 23 and the bands 22 attached thereto is maintained in a straight line by the advance of slotted guide plates 38 and 38' along the upstanding legs of T sections 36 and 36'. Movement of bands 22 inwardly and away from the belt thereon causes the bands to "peel" from the belt. This avoids undesirable sliding action which may result in stretching or other distortion of the belt.

The above description and drawings show that the present invention provides a novel method and apparatus for simply and conveniently removing an endless belt from a surface. Furthermore, the apparatus of the invention permits the doffing of an endless belt from a building drum or other surface automatically and at a rapid rate without distorting the belt. This facilitates integration of a belt building operation into an automated tire building process.

It will be apparent from the above description and drawings that various modifications may be made in the detailed designs and procedures described above within the scope of the invention. For example, the means for aligning the bands and the mechanism for actuating the bands may be of a different design. Also, the cord pattern of the belt may be changed to provide different configurations. In addition, the belt may be of a type useful as a carcass of a tire, a snowmobile belt, drive belts and similar endless structures. Therefore, the above description and drawings are intended to illustrate specific embodiments of the invention, and the scope of the invention is to be limited only by the following claims.

That which is claimed is:

1. Apparatus for removing an endless belt from a drum structure which comprises a substantially cylindrical support, a plurality of pulleys disposed around the periphery of each end of said cylindrical support, a plurality of adjacent bands positioned over said pulleys with the ends of each band connected to form a substantial loop extending longitudinally along the inner and outer surfaces of said cylindrical support, and a longitudinally moveable reciprocating means disposed within said cylindrical support and operatively connected to said bands for simultaneously moving a forward portion of each band around said peripheral pulleys in a hairpin turn whereby an endless belt disposed on said drum structure is advanced off the end thereof.

2. Apparatus according to claim 1 wherein the ends of each band are connected by a flexible cable.

3. Apparatus according to claim 1 including means for separating said forward portions of said bands into alternate levels as said portions contact said pulleys and move toward the axis of said drum.

4. Apparatus according to claim 1 wherein the means for changing the position of said cables and bands includes a thrust ring affixed to an axial push rod movable in a longitudinal direction.

5. Apparatus according to claim 1 including means for adjusting the tension of said bands.

References Cited

UNITED STATES PATENTS

| | | | |
|---|---|---|---|
| 2,440,662 | 4/1948 | Frazier | 156—401 |
| 1,504,255 | 8/1924 | MacDonald | 156—194 X |
| 3,580,784 | 5/1971 | Lee et al. | 156—184 X |
| 2,878,857 | 3/1959 | Smith et al. | 156—394 |
| 2,936,813 | 5/1960 | Haase | 156—394 X |

BENJAMIN R. PADGETT, Primary Examiner

R. GAITHER, Assistant Examiner

U.S. Cl. X.R.

156—173, 395, 414, 415, 420